(12) United States Patent
Yoshimitsu

(10) Patent No.: US 9,345,958 B2
(45) Date of Patent: May 24, 2016

(54) IMAGE PROCESSING APPARATUS FOR FORMING A VIEW FRUSTUM ON A DISPLAY DEVICE

(71) Applicant: Kabushiki Kaisha Sega, Ohta-ku, Tokyo (JP)

(72) Inventor: Tetsu Yoshimitsu, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 429 days.

(21) Appl. No.: 13/846,053

(22) Filed: Mar. 18, 2013

(65) Prior Publication Data

US 2013/0225289 A1 Aug. 29, 2013

Related U.S. Application Data

(63) Continuation of application No. PCT/JP2011/065601, filed on Jul. 7, 2011.

(30) Foreign Application Priority Data

Sep. 30, 2010 (JP) .................. 2010-220720

(51) Int. Cl.
*A63F 13/00* (2014.01)
*A63F 13/40* (2014.01)
*G06T 15/20* (2011.01)

(52) U.S. Cl.
CPC .................. *A63F 13/00* (2013.01); *A63F 13/10* (2013.01); *G06T 15/20* (2013.01); *A63F 2300/643* (2013.01); *A63F 2300/6676* (2013.01); *A63F 2300/6684* (2013.01); *A63F 2300/8076* (2013.01)

(58) Field of Classification Search
CPC ....... G06T 15/20; A63F 13/52; A63F 13/525; A63F 13/5285
USPC ............................................................ 463/32
See application file for complete search history.

(56) References Cited

U.S. PATENT DOCUMENTS

| 6,377,277 B1* | 4/2002 | Yamamoto ............... 345/629 |
| 2005/0266921 A1* | 12/2005 | Hayashida et al. ........... 463/33 |
| 2006/0246968 A1 | 11/2006 | Dyke-Wells |
| 2009/0092286 A1 | 4/2009 | Saneshige |
| 2009/0262112 A1* | 10/2009 | Yoshimura ............... 345/427 |
| 2009/0262117 A1 | 10/2009 | Yoshimura |
| 2014/0354687 A1* | 12/2014 | Kiuchi et al. .............. 345/633 |

FOREIGN PATENT DOCUMENTS

| JP | 3141737 | 12/2000 |
| JP | 3769747 | 2/2006 |
| JP | 2006-268511 | 10/2006 |

(Continued)

*Primary Examiner* — Corbett B Coburn
(74) *Attorney, Agent, or Firm* — Jordan and Hamburg LLP

(57) ABSTRACT

A view frustum, based on a virtual viewpoint, a gaze-point, and a view-angle, is formed in a virtual space in which objects including a player character and an obstacle are arranged. The gaze-point is set to be in a front area of the player character. The virtual viewpoint is set to be at a position separated from the player character by a certain distance in a rear area of the player character. Whether or not a line segment from the gaze-point to the virtual viewpoint crosses the obstacle is determined. The virtual viewpoint is reset to be at a position of a crossing coordinate nearest to the gaze-point. Such coordinate is from among crossing coordinates at which the line segment crosses the obstacle when the line segment crosses the obstacle to increase the view-angle from a preset reference angle.

12 Claims, 13 Drawing Sheets

(56) References Cited

FOREIGN PATENT DOCUMENTS

| JP | 2006-305176 | 11/2006 |
| JP | 2006-122328 | 5/2009 |
| JP | 2009-273865 | 11/2009 |
| JP | 4459993 | 2/2010 |
| JP | 4474640 | 3/2010 |
| JP | 2010-068882 | 4/2010 |

* cited by examiner

IMAGE PROCESSING APPARATUS FOR FORMING A VIEW FRUSTUM ON A DISPLAY DEVICE

CROSS-REFERENCE TO RELATED APPLICATION

This application is a continuation application of International Application PCT/JP2011/065601, filed on Jul. 7, 2011 and designated the U.S., the entire contents of which are incorporated herein by reference.

FIELD

The present invention is related to a technique for generating a display image in a video game, a computer graphics (CG) video, and the like.

BACKGROUND

A third person shooter game (TPS) and a role-playing game (RPG) have been known in which a player character that is arranged in a virtual space is controlled in a bird's eye view.

In such a game, a virtual camera is often set at a predetermined position behind the player character to face the front direction of the player character, so that the player character can be constantly displayed on the screen (for example, see Japanese Unexamined Patent Application Publication No. 2006-305176).

In this case, when there is an obstacle between the virtual camera and the player character, the player character is not displayed on the screen, and thus the player is unable to control the player character. Therefore, there have been proposed a technique of performing control of moving the positions of the virtual camera and the gaze point in accordance with the existence of an obstacle (see Japanese Unexamined Patent Application Publication No. 2006-122328), and a technology of executing processing to make an obstacle transparent (see Japanese Patent No. 3769747).

SUMMARY

However, in the technique disclosed in Japanese Unexamined Patent Application Publication No. 2006-122328, the position of the virtual camera and the gaze point are moved in accordance with the existence of the obstacle, and thus the orientation and the position of the player character in the screen dramatically change, thereby making the player feel strangeness. In addition, in a case in which the virtual camera is set at the position at which the virtual camera collides with the obstacle, when the player character moves backward, the distance between the player character and the virtual camera becomes smaller. That is, the player character comes close to the screen, and thus the player feels pressure.

In addition, in the technique disclosed in Japanese Patent No. 3769747, processing to make the obstacle transparent is executed, and thus an image that is actually unable to see is created. Therefore, the player's immersive feeling to the game in the virtual space is impaired.

The present invention is proposed in view of the above-described conventional problems, and an object of the present invention is to provide an image processing apparatus that generates an image in which immersive feeling to a game is not impaired without giving feeling of strangeness and pressure to the player, a computer-readable storage medium storing a program executed by a computer, and a method implemented by a computer.

According to an aspect of the invention, an image processing apparatus that forms a view frustum based on a virtual viewpoint, a gaze point, and a view angle, in a virtual space in which objects including a player character and an obstacle are arranged, and generates images of the objects that are arranged in the view frustum, comprises: a storage unit which stores orientation and location information of the player character and location information of the obstacle; a gaze point setting unit which sets the gaze point to be in a front area of the player character; a viewpoint setting unit which sets the virtual viewpoint to be at a position that is separated from the player character by a certain distance in a rear area of the player character; a determination unit which determines whether or not a line segment from the gaze point to the virtual viewpoint crosses the obstacle; and a view angle increase unit which resets the virtual viewpoint to be at a position of a crossing coordinate nearest to the gaze point out of crossing coordinates as coordinates at which the line segment crosses the obstacle when the line segment crosses the obstacle to increase the view angle from a preset reference angle.

According to an aspect of the invention, a computer-readable storage medium storing a program for forming a view frustum based on a virtual viewpoint, a gaze point, and a view angle, in a virtual space in which objects including a player character and an obstacle are arranged to generate images of the objects that are arranged in the view frustum, the program causing a computer to execute a process, comprises: obtaining orientation and location information of the player character and location information of the obstacle from a storage device; setting the gaze point to be in a front area of the player character; setting the virtual viewpoint to be at a position that is separated from the player character by a certain distance in a rear area of the player character; determining whether or not a line segment from the gaze point to the virtual viewpoint crosses the obstacle; and resetting the virtual viewpoint to be at a position of a crossing coordinate nearest to the gaze point out of crossing coordinates as coordinates at which the line segment crosses the obstacle when the line segment crosses the obstacle to increase the view angle from a preset reference angle.

According to an aspect of the invention, a method for forming a view frustum based on a virtual viewpoint, a gaze point, and a view angle, in a virtual space in which objects including a player character and an obstacle are arranged to generate images of the objects that are arranged in the view frustum, the method implemented by a computer to effect the following steps: obtaining orientation and location information of the player character and location information of the obstacle from a storage device; setting the gaze point to be in a front area of the player character; setting the virtual viewpoint to be at a position that is separated from the player character by a certain distance in a rear area of the player character; determining whether or not a line segment from the gaze point to the virtual viewpoint crosses the obstacle; and resetting the virtual viewpoint to be at a position of a crossing coordinate nearest to the gaze point out of crossing coordinates as coordinates at which the line segment crosses the obstacle when the line segment crosses the obstacle to increase the view angle from a preset reference angle.

In the image processing apparatus, the computer-readable storage medium and the method according to an embodiment of the present invention, an image can be generated in which immersive feeling to a game is not impaired without giving feeling of strangeness and pressure to the player.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENT

Embodiments of the present invention are described below. It is to be noted that the present invention is not limited by the embodiments.

(Hardware Configuration)

Figure 1:
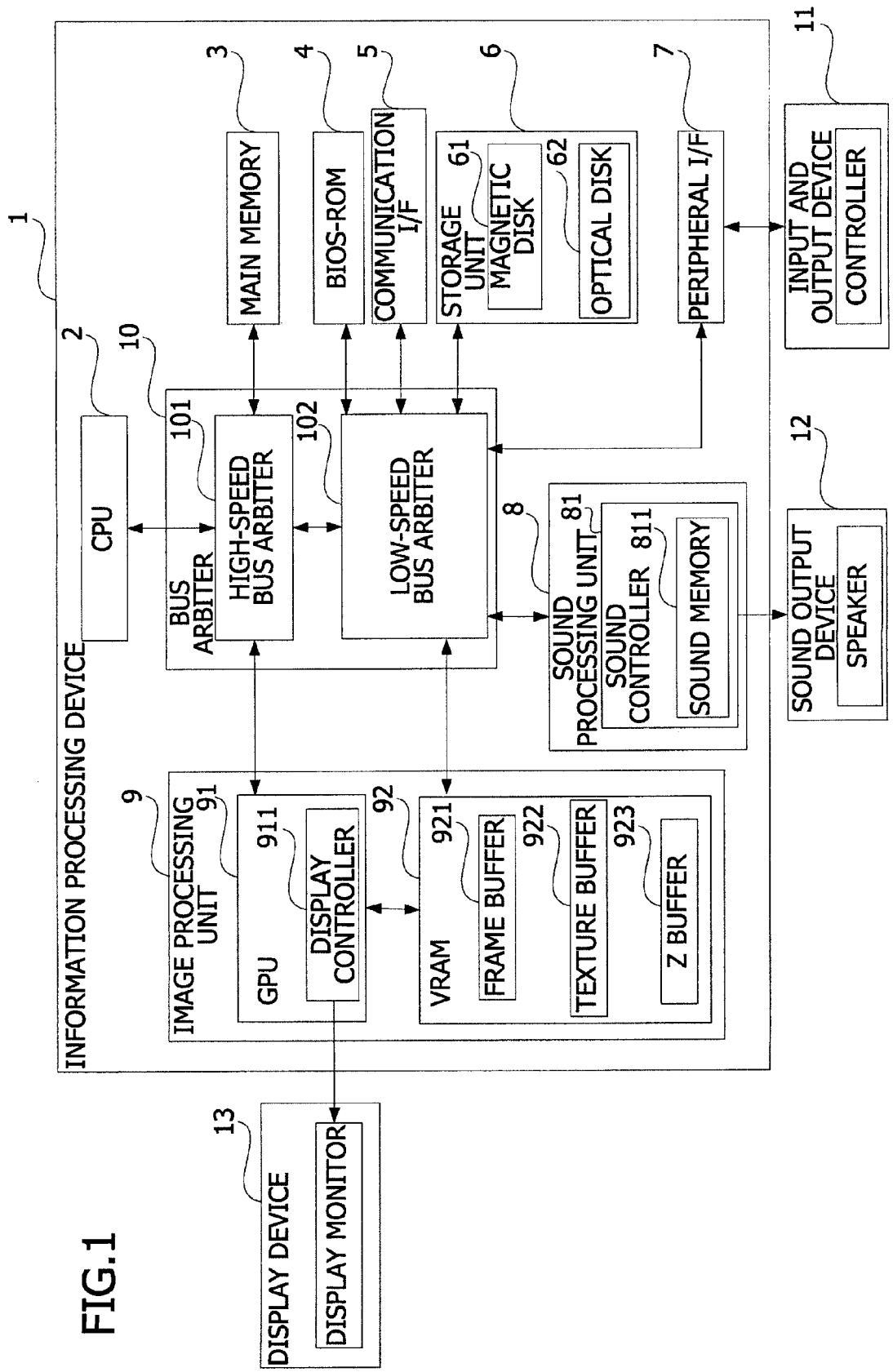
FIG. 1 is a diagram illustrating an example of a hardware configuration according to an embodiment of the present invention.

FIG. 1 is a diagram illustrating an example of a hardware configuration according to an embodiment. An information processing device 1 according to the embodiment is coupled to a controller 11 as an input and output device, a speaker 12 as a sound output device, and a display monitor 13 as a display device, to be used. Here, the display monitor 13 is formed of a cathode-ray tube (CRT), a liquid crystal display device, and the like, and displays, for example, a game screen including a player character. In addition, the controller 11 is provided with a cross button, an operation button, a left joystick, and a right joystick all of which are not illustrated. The player can perform the game operation by performing an input operation through the controller 11. The controller 11 may include an output device such as a vibration device and a sound generator.

The information processing device 1 includes a central processing unit (CPU) 2, a main memory 3, a basic input/output system (BIOS)-read-only memory (ROM) 4, a communication interface 5, a storage unit 6, a peripheral interface 7, a sound processing unit 8, and an image processing unit 9 that are coupled to a bus arbiter 10 through a bus line.

The bus arbiter 10 performs bus arbitration in response to a bus usage request from the devices coupled to the bus arbiter 10 through the bus line and controls the flow of data. In addition, the bus arbiter 10 includes a direct memory access (DMA) function to perform data transfer between devices not involving the CPU in response to the request from the devices. Here, the bus arbiter 10 includes a high-speed bus arbiter 101 that controls a device that performs high-speed data transfer and a low-speed bus arbiter 102 that controls a device that performs low-speed data transfer. Thus, a data transfer speed of the whole system can be increased.

The CPU 2 executes a game program, controls the whole system, performs coordinate calculation for image display, etc., and controls, for example, an action of the player character that appears on the game screen on the basis of an operation signal that is transmitted from the controller 11. The game program includes an image processing program according to the embodiment. Image processing according to the embodiment described later is implemented by executing the image processing program by the CPU 2.

The main memory 3 is used as a memory that stores a program and data used by the CPU 2 to execute processing. Here, the CPU 2 and the main memory 3 are coupled to each other through the high-speed bus arbiter 101.

The BIOS-ROM 4 stores a system program and a program for activating the information processing device 1.

The communication interface 5 is an interface such as a local area network (LAN) line for connection to an external network. Thus, the information processing device 1 can communicate with other information processing devices, network servers, and the like.

The storage unit 6 is formed of a recording medium such as a magnetic disk 61 and an optical disk 62, and stores the game program including the image processing program and data according to the embodiment. The CPU 2 loads the program and data stored in the recording medium onto the main memory 3, in accordance with the content of an operation. For example, the data loaded onto the main memory 3 includes data for defining objects including the player character and an enemy character, image data, and sound data. In addition, the CPU 2 transfers the data stored in a recording medium of which a data transfer speed is low to a recording medium of which data transfer speed is high such as the magnetic disk, and thus improves an access speed of the information processing system as a whole.

The peripheral interface 7 is an interface such as a USB interface, an IEEE1394 interface, a serial interface, a parallel interface, an infrared interface, and a wireless interface, which is used for connection to the peripheral device such as the controller 11. The peripheral interface 7 transmits an operation signal that is transmitted from the controller 11 to the low-speed bus arbiter 102. The peripheral interface 7 can also transmit a vibration signal and a sound signal corresponding to the game situation to the controller 11.

The sound processing unit 8 includes a sound controller 81 including a sound memory 811. The sound processing unit 8 reads sound data stored in the storage unit 6 and the sound memory 811 to generate sound. In addition, the sound controller 81 outputs, for example, the sound generated in accordance with the operation by the player and the game progression to a speaker 13.

The image processing unit 9 includes a graphics processing unit (GPU) 91 and a video random access memory (VRAM) 92. Here, the VRAM 92 includes storage areas such as a frame buffer 921, a texture buffer 922, and a Z buffer 923. The frame buffer 921 is used to store pixel data per frame for a screen display. The texture buffer 922 is used to store image data (texture) serving as a material for performing texture mapping on a polygon that forms an object. The Z buffer 923 is used to store depth information of the object in each of the pixels for the screen display.

The image processing unit 9 executes vertex processing on the basis of data of the polygon that forms the object (a vertex coordinate, a texture coordinate, a color value, an α value, a normal vector, and the like), and executes pixel processing such as rasterization, texture mapping, and hidden surface removal. Then, the image processing unit 9 stores the pixel data obtained by the pixel processing in the frame buffer 921.

In the display image generation, under the control by the CPU 2, the polygon that forms the object to be displayed in accordance with the game situation is arranged in the virtual space, and is converted into a two-dimensional image viewed from a virtual camera VP (virtual viewpoint) by the processing of the GPU 91, and thus the image is generated.

Figure 2A:
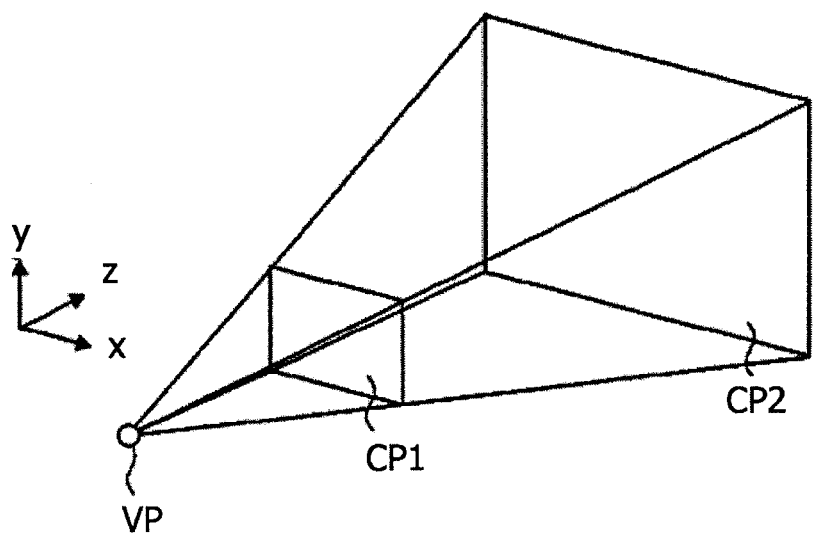
FIGS. 2A and 2B are diagrams respectively illustrating examples of a view space and a projective space.
Figure 2B:
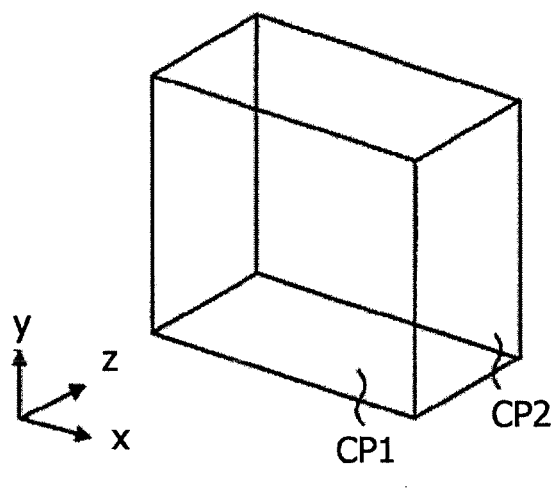

The GPU 91 executes world transformation, lighting calculation, view transformation, clipping, projective transformation, view port transformation, and the like as the vertex processing. FIG. 2A is a diagram illustrating an example of a view space. The view space is a coordinate space obtained by converting a world space on the basis of information on the virtual camera VP, a gaze point GP, and the upward direction of the virtual camera VP, and in the view space, regarding a direction from the virtual camera VP to the gaze point GP, the horizontal axis is an x-axis, the vertical axis is a y-axis, and the depth is a z-axis. In addition, as the clipping, in a range in which the direction from the virtual camera VP to the gaze point GP is pivoted by a view angle in the x-axis direction and the y-axis direction, a near clip plane CP1 is set on the side nearer to the virtual camera VP, and a far clip plane CP2 is set on the side farther from the virtual camera VP. A hexahedral defined by the near clip plane CP1, the far clip plane CP2, and surfaces indicating the view angle is referred to as a view frustum, and an object that is arranged in the view frustum is a drawing target. FIG. 2B illustrates an example of a projective space on which projective transformation is performed, and is obtained by converting the view space illustrated in FIG. 2A into a space within a range of "$-1 \leq x \leq 1$", "$-1 \leq y \leq 1$", and "$0 \leq z \leq 1$" on the basis of information on the view angle, an aspect ratio, the near clip plane CP1, and the far clip plane CP2. In addition, a vertex shader in the GPU 91 performs view port transformation on the vertex of the polygon of the projective space as a result of the conversion into the projective space, and thus the vertex processing is completed.

The GPU 91 performs, as the pixel processing, rasterization and interpolation on the basis of data of lines, dots, and the polygon formed by the vertex processing. In addition, the texture mapping, alpha test, depth test (hidden surface removal) based on the depth information, blending, and the like are performed on the pixel data on which the rasterization and interpolation are performed and, and pixel data arranged on the screen is stored in the frame buffer 921.

In addition, a display controller 911 in the GPU 91 periodically reads pixel data recorded in the frame buffer 921 and transmits a video signal to the display monitor 13.

(Description of Various Types of Data)

Figure 3:
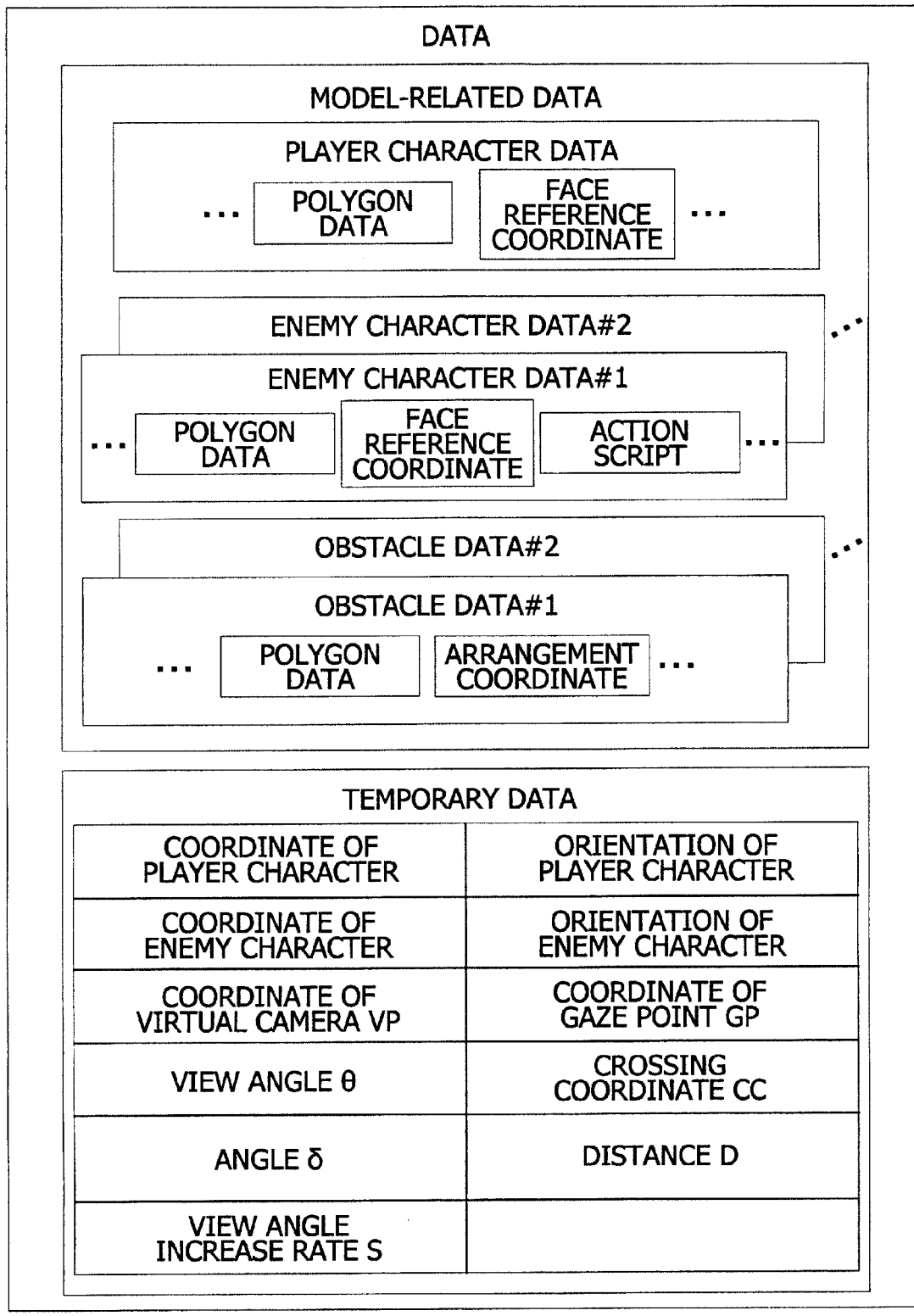
FIG. 3 is a diagram illustrating an example of data used for image processing in an information processing device.

FIG. 3 is a diagram illustrating examples of data used for the image processing in the information processing device 1. The data includes model-related data and temporary data.

The model-related data includes player character data, enemy character data, and obstacle data as objects.

The player character data is character data that is mainly controlled by the operation from the player through the controller 11, and includes polygon data that forms the player character and a face reference coordinate. Here, the polygon data includes a vertex coordinate, a texture coordinate, a color value, α value, and a normal vector. The enemy character data and the obstacle data are similarly configured. The face reference coordinate is, for example, a three-dimensional coordinate of a part little above the neck of the player character.

The enemy character data is data for a plurality of characters that fight against the player character, and includes polygon data that forms the enemy character, a face reference coordinate, and an action script. In the action script, an action start condition and action contents of the enemy character are described. For example, when the CPU 2 determines that the player character is within a tracking start distance of the enemy character, the enemy character starts tracking the player character. In addition, when the CPU 2 determines that the player character is within an attack start distance of the enemy character, the enemy character starts attacking the player character.

The obstacle data is data related to a plurality of obstacles such as a the ground GR, a wall W, and a ceiling CL defining a range in which the player character and the virtual camera VP are unmovable, and includes the polygon data and an arrangement coordinate at which the obstacle is arranged in the virtual space that form the obstacle.

The temporary data includes, as data in the virtual space: values of information on the coordinates and orientations of the player character and enemy character; the coordinate of the virtual camera VP (virtual viewpoint), the coordinate of the gaze point GP, the view angle θ, a crossing coordinate CC that is the nearest to the gaze point GP out of crossing coordinates at which a line segment from the gaze point GP to the virtual camera VP crosses the obstacle, an angle δ between a vector from the position of the virtual camera VP to the gaze point GP and a normal vector of the obstacle in the crossing coordinate CC, and a distance D between the virtual camera original position VP' and the virtual camera new position VP (the crossing coordinate CC). In addition, the temporary data includes a value of a view angle increase rate S used for increasing the current view angle. Here, the information on the orientation of the player character and the enemy character corresponds, for example, to the orientation of the body or a direction in which the projectile is projected.

(Operation)

An operation of the image processing implemented by execution of the image processing program according to the embodiment is described below with an example of a screen of a third person shooter game.

Figure 4:
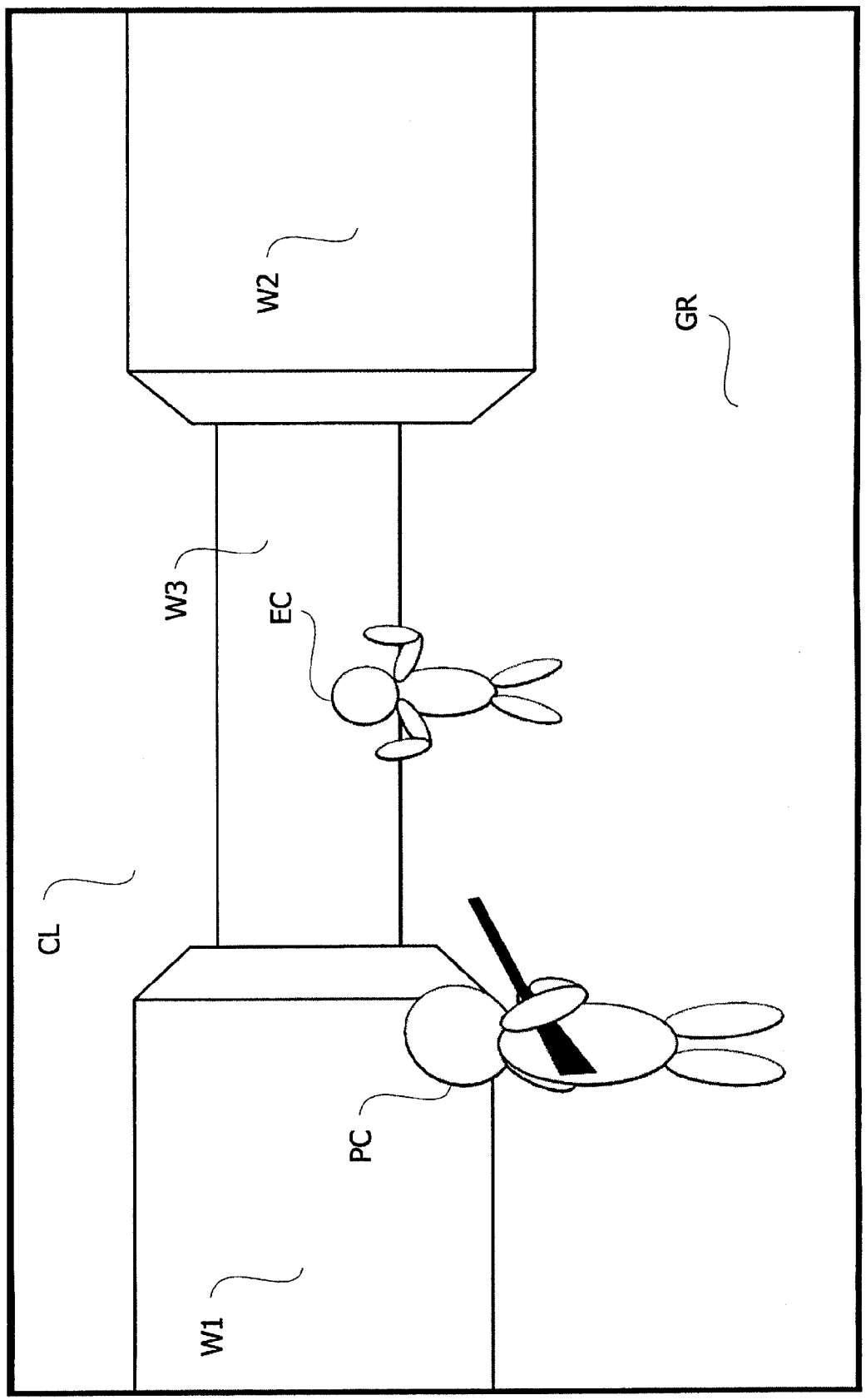
FIG. 4 is a first view illustrating an example of a game screen.
Figure 5:
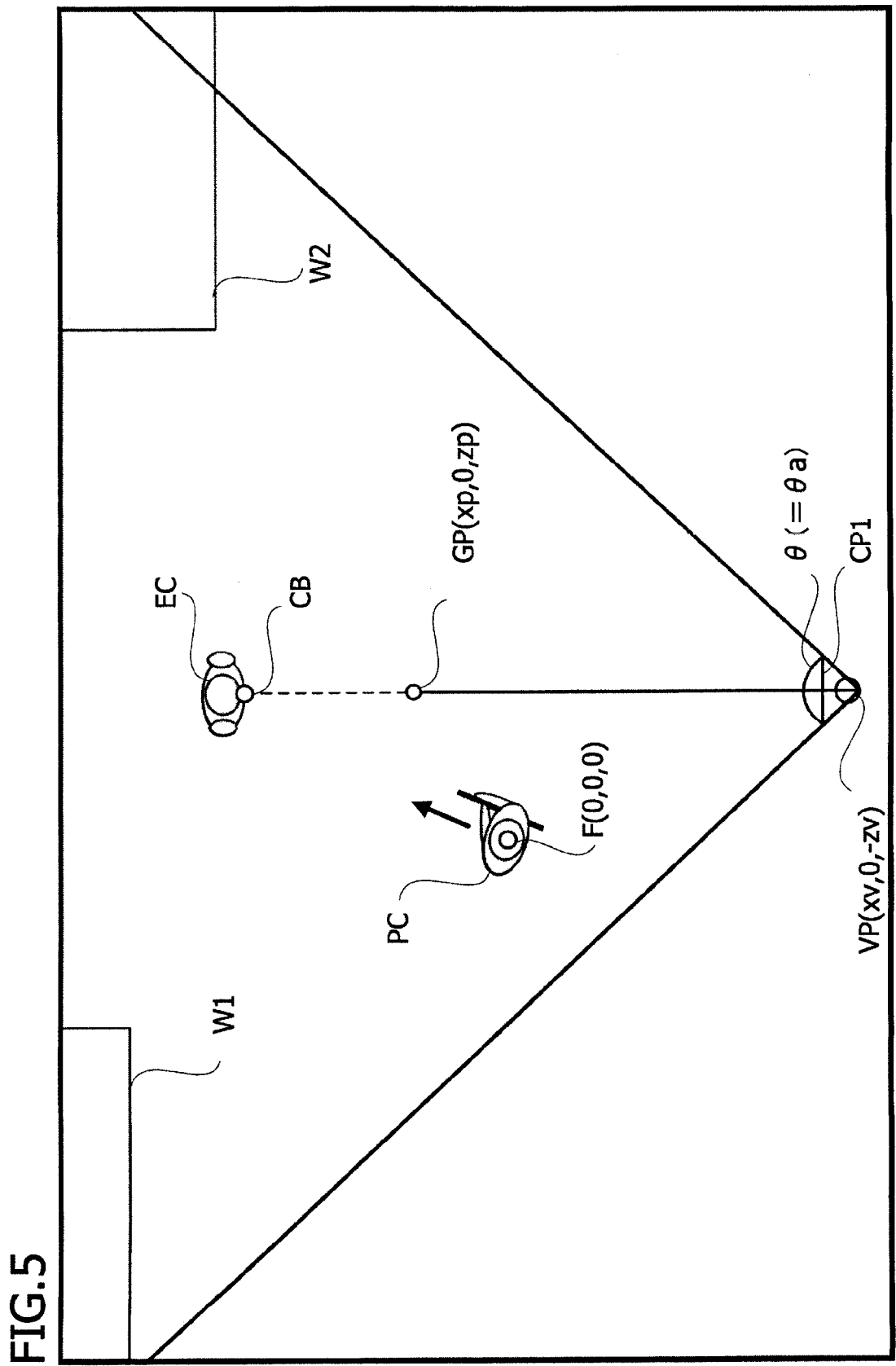
FIG. 5 is a first top view of a virtual space.

FIG. 4 is a view illustrating an example of a screen of the third person shooter game according to the embodiment. FIG. 5 is a top view of a virtual space in FIG. 4 and illustrates the setting positions of the virtual camera VP and the gaze point GP, and the view angle θ, as well as the position and the front direction (arrow direction) of the player character PC, and the like.

In FIG. 4, the player character PC and the enemy character EC, as well as the ground GR, the walls W1 to W3, and the ceiling CL as obstacle objects are arranged in the virtual space. In addition, in FIG. 4, the player character PC is always displayed on the left side of the screen so that the player character is never displayed at the center of the screen, which is an aim position. By thus fixing the aim position at the center of the screen, the player can easily realize the attacking direction of the player character PC.

In addition, in FIG. 5, in a coordinate system in which a face reference coordinate F of the player character PC is "(x, y, z)=(0, 0, 0)", where the right direction of the player character PC is an x direction, the upward direction of the player character PC is a y direction, and the front direction of the player character PC is a z direction, the CPU 2 sets the gaze point GP at the right front (xp, 0, zp) of the player character PC, and sets the position of the virtual camera VP at the right rear (xv, 0, −zv) of the player character PC. Here, "xp", "zp", "xv", and "zv" are positive values, and each of the values are set in such a manner that the player character PC is included in the view frustum. The CPU 2 stores in the main memory 3, data obtained by converting the positions of the gaze point GP and the virtual camera VP back into the coordinate system in the virtual space.

As long as the player character is not displayed at the center of the screen, for example, the virtual camera VP may be set in any area behind the player character, and the gaze point GP may be shifted to the right front or left front of the player character. Alternatively, the gaze point GP may be set in the front area of the player character, the position of the virtual camera VP may be shifted to the right rear or left rear of the player character. In addition, the position of the virtual camera VP may be above the head of player character.

The CPU 2 sets the near clip plane CP1 and the far clip plane CP2 on the basis of a distance to the near clip plane CP1 and a distance to the far clip plane CP2 in the direction from the virtual camera VP to the gaze point GP. In addition, the CPU 2 sets the view angle θ to a value of a preset reference view angle θa, and forms the view frustum on the basis of the near clip plane CP1, the far clip plane CP2, and the view angle θa. Here, the values are set in such a manner that the player character is included in the view frustum, and as illustrated in FIG. 5, the near clip plane CP1 is set at a position near the virtual camera VP, and the far clip plane CP2 is set at a far position outside the area illustrated in the drawings.

In this game, the player can move the position of player character by operating the left joystick of the controller 11, and change the orientation of the player character by operating the right joystick. Thus, the player can move the player character not only in the front direction, but also in the rear direction and left and right directions. When the player moves the player character or changes the orientation of the player character, the CPU 2 updates information on a three-dimensional coordinate of the face reference coordinate and the orientation of the player character that are stored in the main memory 3, and calculates a coordinate system based on the above-described information on the face reference coordinate and orientation of the player character to reset coordinate positions of the gaze point GP and the virtual camera VP.

In addition, the player can project the projectile such as a bullet that is projected from a weapon of the player character to an arrival position on a straight line from the virtual camera VP through the gaze point GP by operating the operation button of the controller 11. In FIG. 4, the arrival position is an aim position at the center of the screen. Here, as illustrated in FIG. 5, the arrival position at which the projectile such as the bullet arrives is a crossing coordinate at which the straight line from the virtual camera VP through the gaze point GP crosses the object, and is set at a crossing coordinate CB that is nearest to the position of the virtual camera VP. When the object that crosses the straight line at the crossing coordinate CB is the enemy character, the CPU 2 may reset the gaze point GP to the crossing coordinate CB or the coordinate of the enemy character and perform lock-on. In addition, the CPU 2 may calculate an estimated trajectory of the projectile from the position of the player character toward the front direction of the player character and reset the gaze point GP at the coordinate of the enemy character when the enemy character is in the expected trajectory. This allows a beginner player to aim the enemy character easily. In addition, the CPU 2 determines whether or not the projectile such as the bullet arrives at the enemy character or the obstacle, and reflects the result in the game progression.

Here, a case is considered in which the player character moves backward and comes close to the wall behind the player. In this case, the virtual camera VP that is located at the right rear of the player character might collide with the wall surface and pass through the wall surface.

Figure 6:
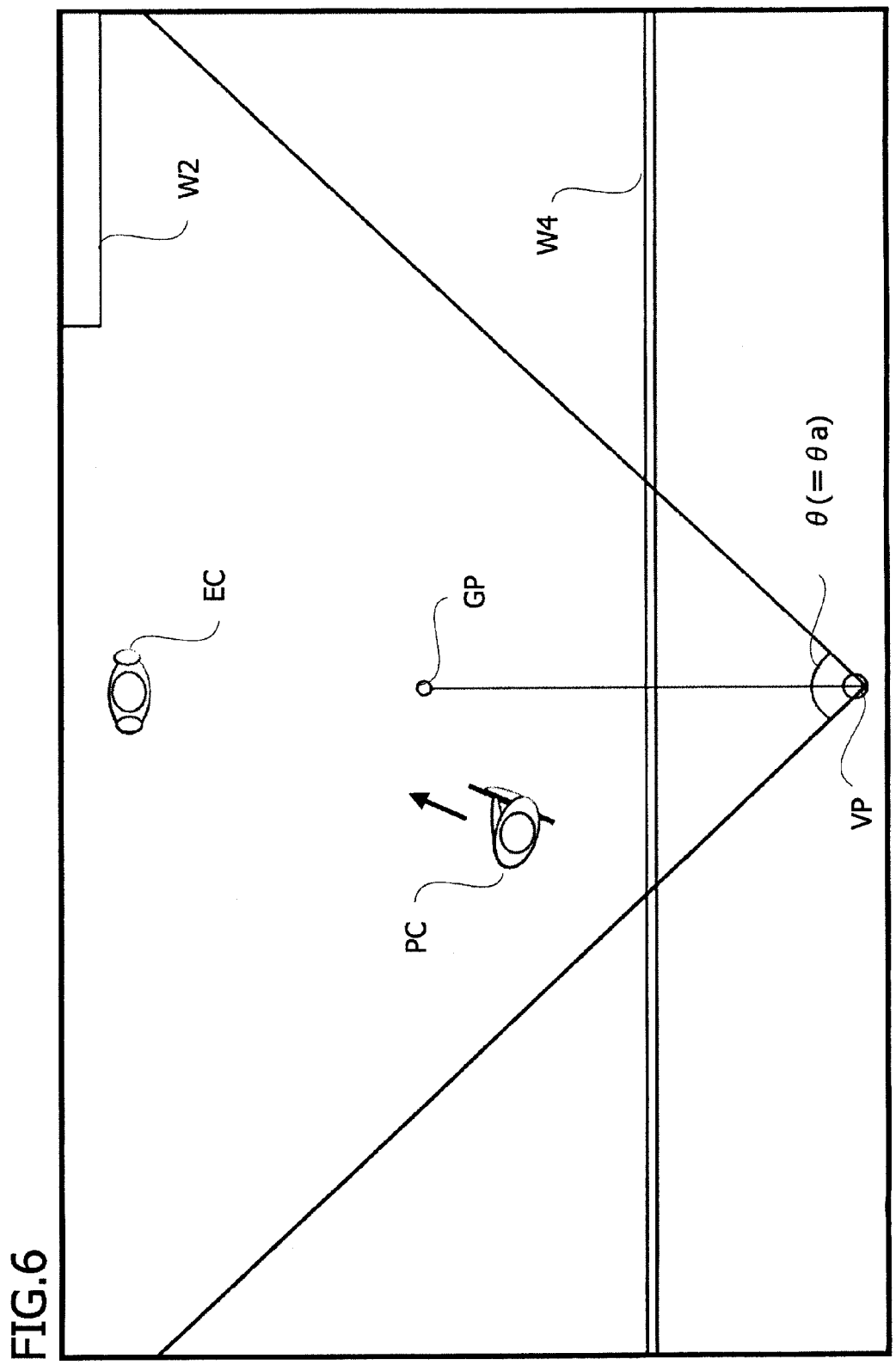
FIG. 6 is a second top view of the virtual space.

FIG. 6 is a top view of the virtual space in a state where the virtual camera VP is located beyond the wall. The virtual camera VP is located on the back side of the wall W4 behind the player character PC. Thus, when this state is drawn as it is, since there is the wall W4 between the virtual camera VP and the player character PC, an image in which the whole screen is covered by the wall W4 is generated. Thus, an image of the front area of the wall W4, which is supposed to be displayed, is not able to be displayed.

Therefore, when the virtual camera VP collides with the obstacle such as the wall W4 and is located inside or behind the wall, an image of the front side of the wall W4 is drawn after resetting the virtual camera VP at the coordinate at which the virtual camera VP collides with the wall W4.

Figure 7:
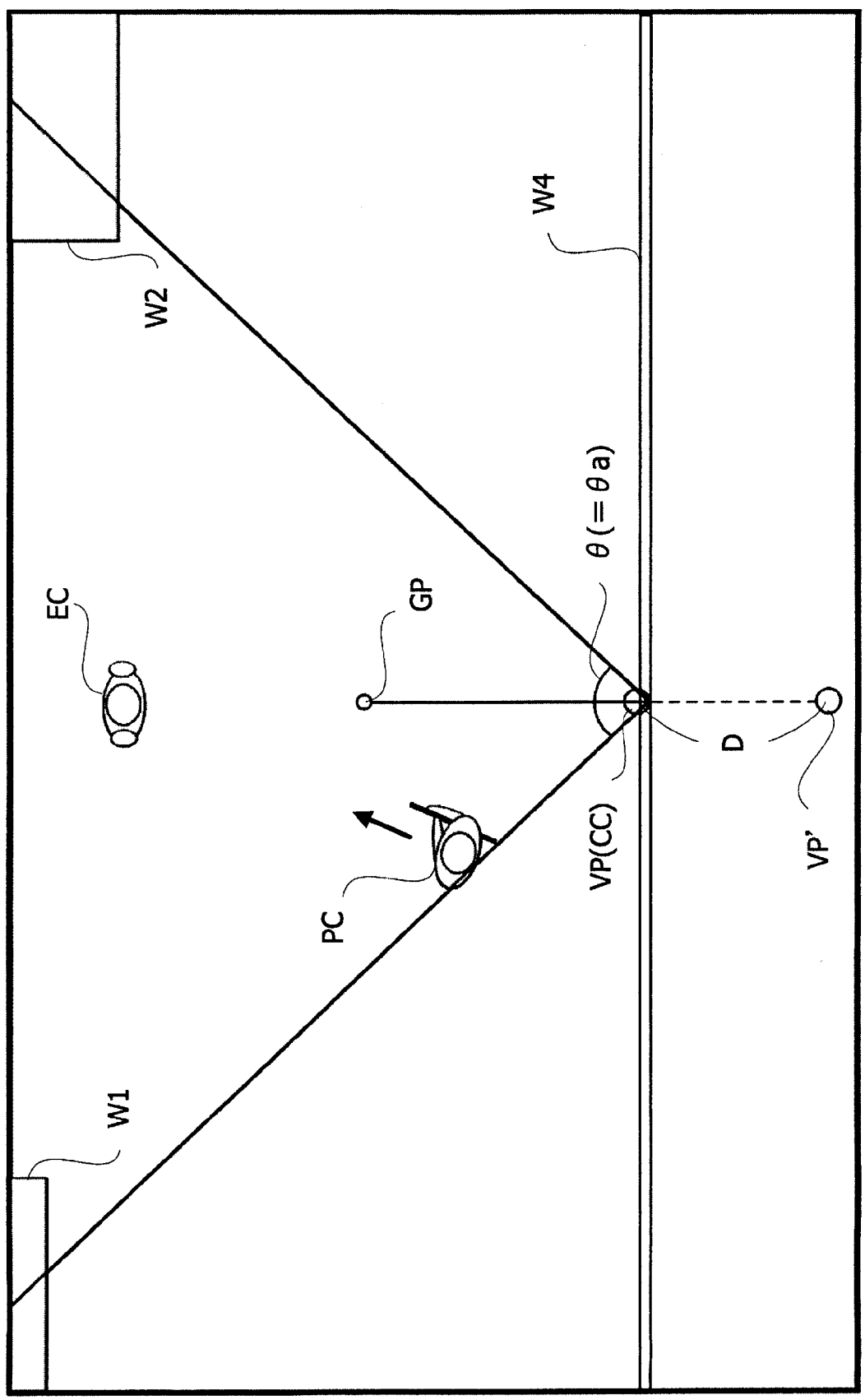
FIG. 7 is a third top view of the virtual space.
Figure 8:
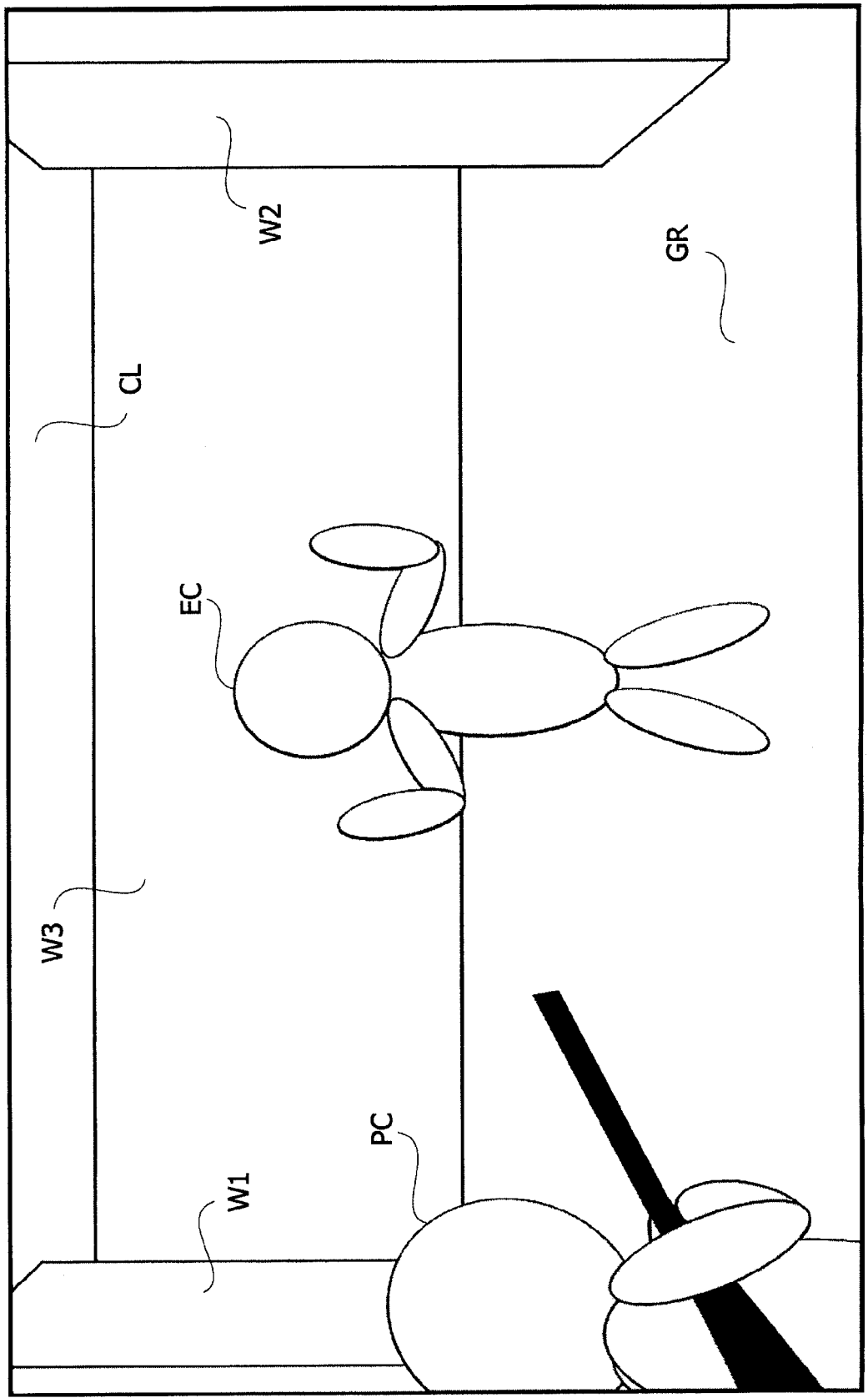
FIG. 8 is a second view illustrating the example of the game screen.

FIG. 7 is a top view of the virtual space in a state where the virtual camera VP is set at the coordinate at which the virtual camera VP collides with the wall, and FIG. 8 is a view illustrating an example of a screen that is displayed by the virtual camera VP illustrated in FIG. 7. As illustrated in FIG. 7, when an original virtual camera VP' that is originally set behind the wall W4 is reset to the virtual camera VP at the coordinate CC at which the virtual camera VP collides with wall W4, an image of the front of the wall W4, where the player character PC and the enemy character EC are located is displayed, as illustrated in FIG. 8.

Here, since the reset virtual camera VP is located more on the front side by a distance D than the original virtual camera VP', a distance between the virtual camera VP and the player character PC is reduced. Therefore, as illustrated in FIG. 8, the player character PC becomes larger in the screen. As a result, the player feels as if the player character PC comes close to the player, and thus feels pressure and strangeness.

In the image processing according to the embodiment, the view angle θ is increased when the coordinate of the virtual camera VP is changed to that at which the virtual camera VP collides with the wall W4, so as to prevent the player from feeling the pressure and strangeness.

Figure 9:
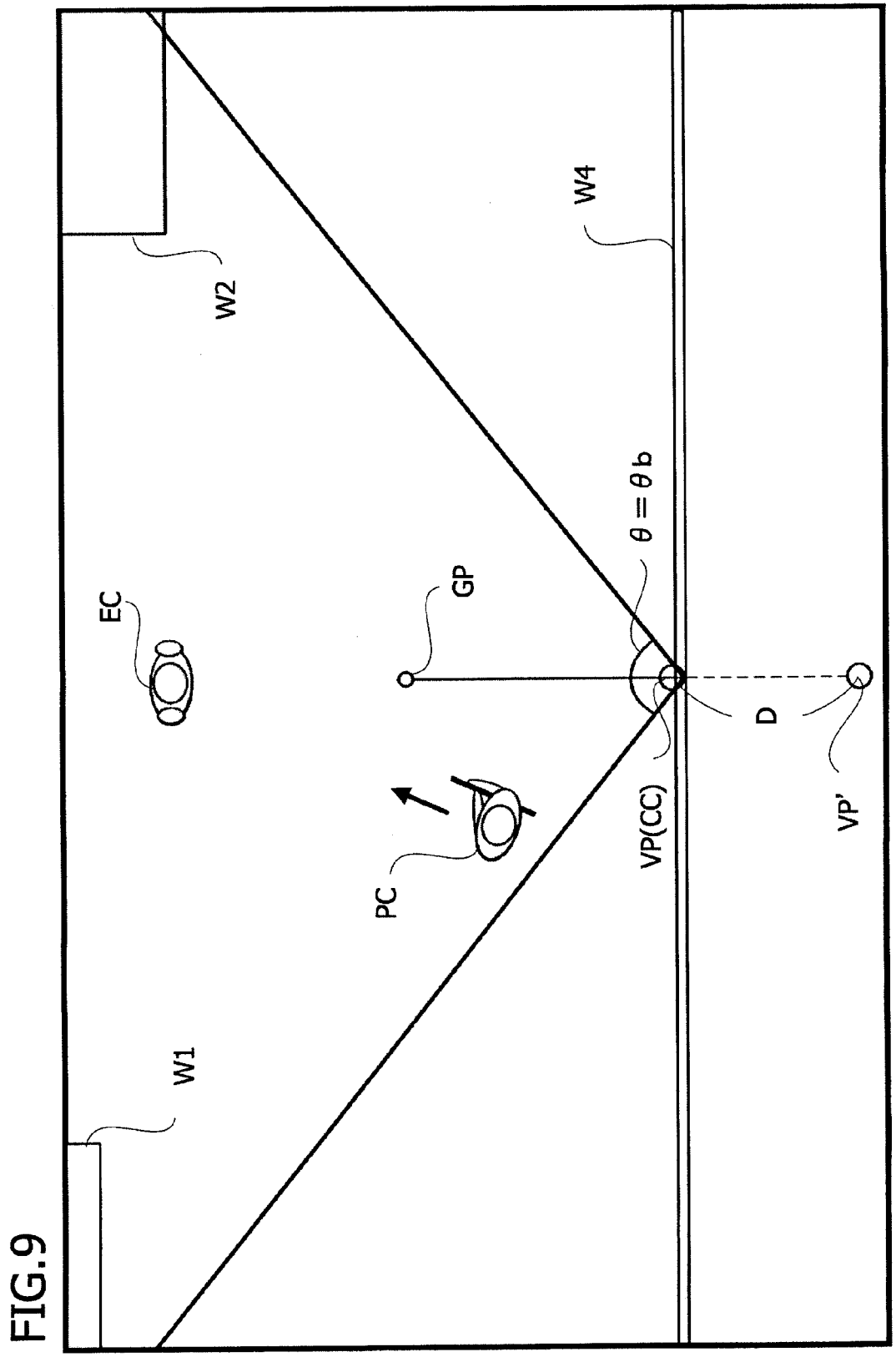
FIG. 9 is a fourth top view of the virtual space.
Figure 10:
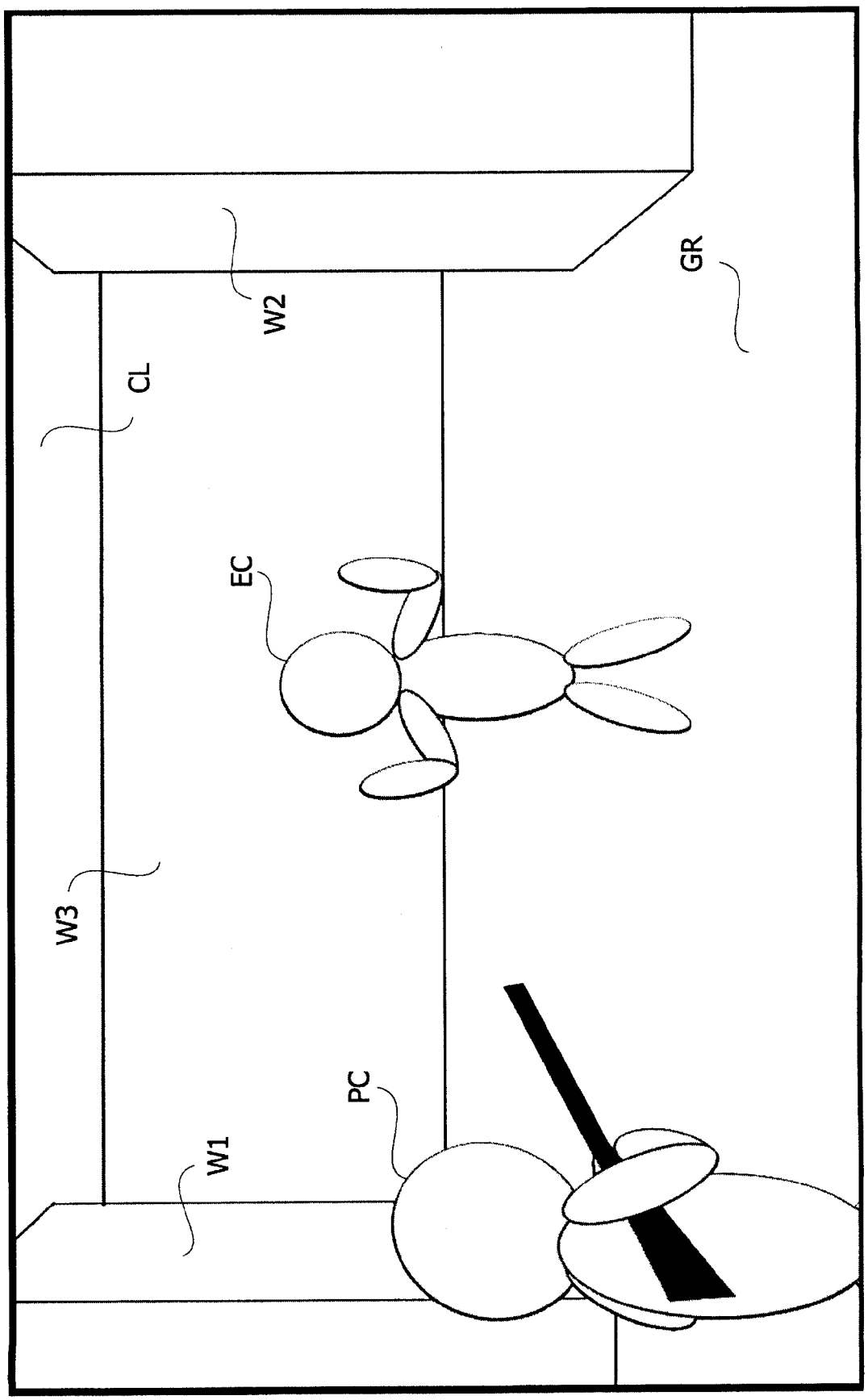
FIG. 10 is a third view illustrating the example of the game screen.

FIG. 9 is a top view of the virtual space, in a state where the view angle is increased, and FIG. 10 is a diagram illustrating an example of a screen that is displayed by the virtual camera VP illustrated in FIG. 9. As illustrated in FIG. 9, when the virtual camera VP is set at the coordinate CC at which the virtual camera VP collides with the wall W4, the view angle θ is set to an angle θb larger than a preset reference view angle θa. A drawn range is expanded by increasing the view angle, and the object as a drawn target is relatively downsized. Therefore, as illustrated in FIG. 10, the change in the image caused by rapid forward movement of the virtual camera VP, is reduced, so that the pressure and strangeness the player feel can be reduced.

Figure 11:
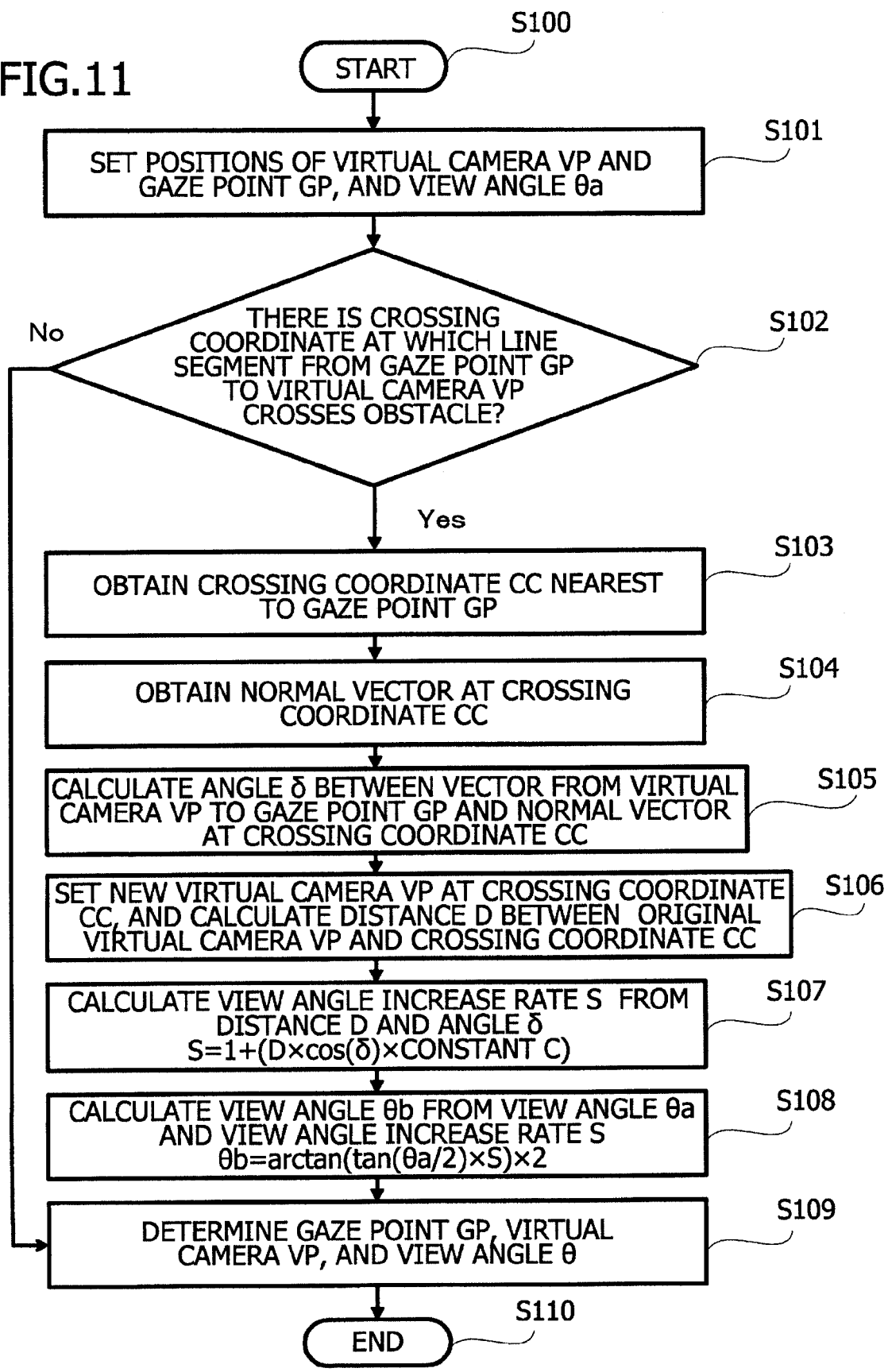
FIG. 11 is a flowchart illustrating and example of view angle increase processing.

FIG. 11 is a flowchart illustrating the image processing according to the embodiment, and the image processing is processing to obtain an increased view angle. The image processing is implemented when the CPU 2 executes an image processing program. In FIG. 11, when the processing starts for each frame or every predetermined number of frames (Step S100), the positions of the virtual camera VP and gaze point GP are set, and the view angle θ is set to "θa" (Step S101). Here, "θa" is a predetermined value determined in such a manner that the player character is included in the view frustum.

Next, whether there is a crossing coordinate at which a line segment from the gaze point GP to the virtual camera VP crosses the obstacle is determined (Step S102). When there is no such crossing coordinate (No in Step S102), the virtual camera VP and view angle θ (=θa) are determined (Step S109), and the processing is completed (Step S110).

When there is such a crossing coordinate (Yes in Step S102), a crossing coordinate CC nearest to the gaze point GP is obtained (S103). The case where there is the crossing coordinate is, as illustrated in FIG. 9, for example, the case where the player character PC moves rearward and comes close to the wall W4 behind the player character, and thus the virtual camera VP that is located at the right rear of the player character collides and then passes through the wall surface.

After that, a normal vector of the obstacle at the crossing coordinate CC is obtained (Step S104). Then, an angle δ between a vector from the virtual camera VP to the gaze point GP and the normal vector of the obstacle at the crossing coordinate CC is calculated (Step S105).

After that, the crossing coordinate CC is set to the virtual camera new position VP, and the distance D between the original position of the virtual camera VP and the crossing coordinate CC (the new position of the virtual camera VP) is calculated (Step S106).

After that, a view angle increase rate S is calculated from the distance D and the angle δ (Step S107). Here, the view angle increase rate S is a value to determine the number by which the current view angle θa is multiplied and is calculated by the formula "S=1+(D×cos(δ)×C)", where "C" is a constant.

Figure 12:
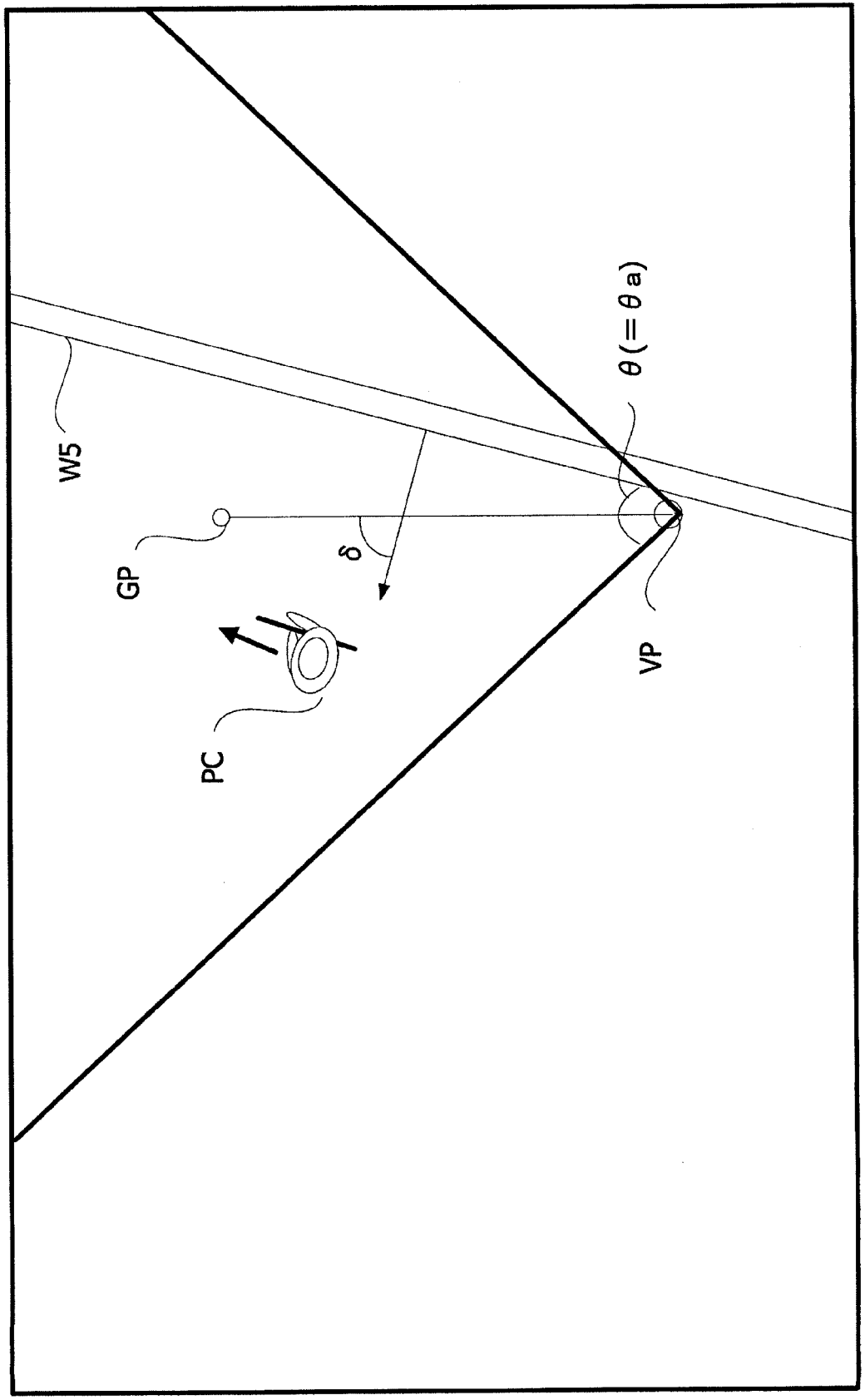
FIG. 12 is a fifth top view of the virtual space.
Figure 13:
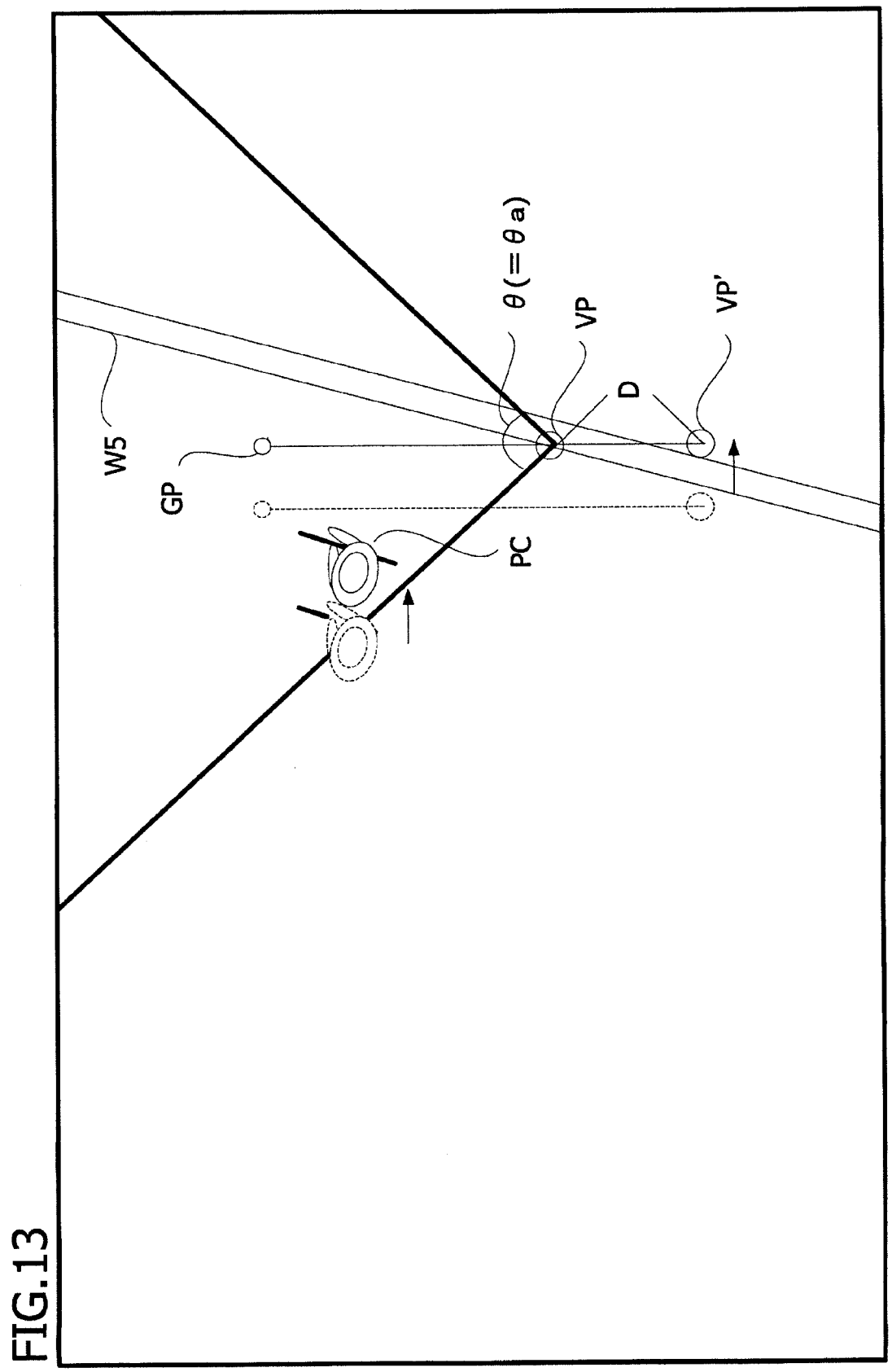
FIG. 13 is a sixth top view of the virtual space.

The reason why the distance D is multiplied by the angle δ in the above-described formula to obtain the view angle increase rate S is as follows. FIG. 12 is a top view of the virtual space in a state where the player character faces a direction indicated by the arrow and moves in the right direction. A normal vector at a wall W5 is inclined by an angle δ with respect to a vector from the gaze point GP to the virtual camera VP, and the wall W5 is located at the right of the player character PC. The virtual camera VP moves rightward along with the movement of the player character PC, with the direction to the gaze point GP being the front direction. FIG. 13 is a top view of the virtual space in a state where the virtual camera VP collides with the wall W5 that is located at the right of the virtual camera VP after the state illustrated in FIG. 12, and the virtual camera VP is reset from the original virtual camera VP' to the crossing coordinate CC. Here, as described above, in the case in which the virtual camera VP is reset from the original virtual camera VP' to the crossing coordinate CC, the distance D is larger in the case where the virtual camera VP collides with the obstacle that is located at the right of the virtual camera VP, than in the case in which the virtual camera VP collides with the obstacle that is located behind the virtual camera VP. When the virtual camera VP collides with the obstacle behind the virtual camera VP (angle δ=0), a backward movement distance of the player character PC is directly related to the distance D, and when the virtual camera VP collides with the wall W5 while being inclined with respect to the wall W5 (angle δ>0), as illustrated in FIG. 13, the distance D is larger than the rightward movement distance of the player character PC.

That is, when the player character PC comes close to the obstacle inclined with respect to the vector from the gaze point GP to the virtual camera VP, a slight movement of the player character PC leads to a rapid movement of the view angle, and thus the player feels strangeness. Thus, when the view angle increase rate S is calculated, the increase rate is adjusted by multiplying the distance D by cos (δ).

Returning to FIG. 11, a new view angle θb is calculated from the current view angle θa and the view angle increase rate S (Step S108). Here, the view angle θb is calculated by the formula "θb=arctan(tan(θa/2)×S)×2".

After that, the positions of the gaze point GP and the virtual camera VP, and the view angle θ (=θb) are determined (Step S109), and the processing is completed (Step S110).

As described above, when the vector from the gaze point GP to the virtual camera VP crosses the obstacle due to the movement of the player character, the virtual camera VP is set at the crossing coordinate, and the view angle is increased from the reference angle θa to the calculated angle θb. The view angle increase rate S to calculate an increased view angle is increased as the distance D increases. Therefore, even in a case where the player character moves further backward after the virtual camera VP collides with the obstacle therebehind, the view angle can be increased gradually. That is, even when the virtual camera VP is unable to move backward any more due to the obstacle, the player can feel as if the virtual camera VP is gradually moving backward (moving beyond the obstacle).

The view angles θa and θb may be a horizontal view angle, and may be a virtual view angle. When one of the view angles is calculated, on the basis of a preset aspect ratio, the other view angle can be obtained.

CONCLUSION

As described above, even when there is an obstacle between the gaze point GP and the virtual camera VP, the player character can be displayed naturally, and thus the player can be prevented from feeling pressure and the like.

The present invention is described with reference to the preferable embodiment of the present invention. Here, the present invention is described using certain specific examples. However, it is apparent that various changes and modifications can be made on the specific examples without departing from the broad spirit and scope of the present invention as defined in the claims. That is, it is not be construed that the present invention is limited by the details of the specific example and the accompanying drawings

The invention claimed is:

1. A non-transitory computer-readable storage medium storing a program for forming a view frustum based on a virtual viewpoint, a gaze point, and a view angle, in a virtual space in which objects including a player character and an obstacle are arranged to generate images of the objects that are arranged in the view frustum, the program causing a computer to execute a process, comprising:
   obtaining orientation and location information of the player character and location information of the obstacle from a storage device;
   setting by a processor of the computer a first value of the gaze point, said first value corresponding to a first location in said virtual space that is in front of the player character;
   setting by the processor a second value of the virtual viewpoint, the second value corresponding to a second location in said virtual space that is behind the player character by a certain distance;
   determining by the processor whether a location of said obstacle is intersected by a line segment in said virtual space from the gaze point to the virtual viewpoint; and
   resetting by the processor the virtual viewpoint to correspond to a location within said virtual space of a crossing coordinate nearest to the gaze point, said crossing coordinate being from among a range of crossing coordinates for which the line segment crosses the obstacle so as to increase the view angle from a preset reference angle;

forming by the processor the view frustum based on said virtual viewpoint, said gaze point, and said view angle, in said virtual space; and displaying a portion of the frustum on a display of the computer.

2. The non-transitory computer-readable storage medium according to claim 1, wherein the program causing the computer to execute said process, further comprises:

calculating a distance between the virtual viewpoint set by the processor and the crossing coordinate; and increasing the view angle as the calculated distance increases.

3. The non-transitory computer-readable storage medium according to claim 2, wherein the program causing the computer to execute said process, further comprises:

obtaining vector information of the obstacle at the crossing coordinate; and reducing the increased angle of the view angle as an angle between a vector from the crossing coordinate to the gaze point and a vector of the obstacle increases.

4. The non-transitory computer-readable storage medium according to claim 1, wherein the virtual viewpoint is set at a position at a right rear or left rear of the player character.

5. The non-transitory computer-readable storage medium according to claim 4, wherein said objects include an enemy character, and wherein the program causing the computer to execute said process, further comprises:

calculating crossing coordinates at which a straight line from the virtual viewpoint through the gaze point crosses the obstacle or the enemy character; and setting as an arrival position of a projectile that is projected from the player character, the crossing coordinate nearest to the virtual viewpoint, said crossing coordinate being from among a range of crossing coordinates for which the line segment crosses the obstacle so as to increase the view angle from a preset reference angle.

6. The non-transitory computer-readable storage medium according to claim 4, wherein said objects include an enemy character, and wherein the program causing the computer to execute said process, further comprises:

calculating an expected trajectory of the projectile that is projected in a front direction from the player character based on the orientation and location information of the player character; and setting as the gaze point, a crossing coordinate nearest to the virtual viewpoint, out of crossing coordinates at which the expected trajectory crosses the obstacle or the enemy character.

7. A method for forming a view frustum on a display device during execution by a processor of a game program including player character data, enemy character data, and object data, which respectively define a player character, an enemy character, and an obstacle within a virtual space, the view frustum being based on a virtual viewpoint, a gaze point, and a view angle, the method comprising the following steps:

obtaining by said processor orientation and location information of the player character and location information of the obstacle from a storage device;

determining a first value of the gaze point by said processor, said first value corresponding to a first location in said virtual space that is in front of the player character;

determining a second value of the virtual viewpoint by said processor, the second value corresponding to a second location in said virtual space that is behind the player character by a certain distance;

determining by said processor whether a location of said obstacle is intersected by a line segment in said virtual space from the gaze point to the virtual viewpoint;

revising the virtual viewpoint by said processor to a third value corresponding to a location within said virtual space of a crossing coordinate nearest to the gaze point, said crossing coordinate being from among a range of crossing coordinates for which the line segment crosses the obstacle so as to increase the view angle from a preset reference angle; and displaying on the display device the player character, enemy character, and obstacle within the frustum corresponding to said gaze point, virtual viewpoint, and the view angle.

8. The method according to claim 7, further comprising the following steps:

calculating by said processor a distance between the virtual viewpoint and the crossing coordinate; and increasing by said processor the view angle as the calculated distance increases.

9. The method according to claim 8, further comprising the following steps:

obtaining by said processor vector information of the obstacle at the crossing coordinate; and reducing by said processor the increased angle of the view angle as an angle between a vector from the crossing coordinate to the gaze point and a vector of the obstacle increases.

10. The method according to claim 7, wherein the virtual viewpoint is set by said processor at a position at a right rear or left rear of the player character.

11. The method according to claim 10, further comprising the following steps:

calculating by said processor crossing coordinates at which a straight line from the virtual viewpoint through the gaze point crosses the obstacle or the enemy character; and setting by said processor as an arrival position of a projectile that is projected from the player character, the crossing coordinate nearest to the virtual viewpoint; out of the calculated crossing coordinates.

12. The method according to claim 10, further comprising the following steps:

calculating by said processor an expected trajectory of the projectile that is projected in a front direction from the player character based on the orientation and location information of the player character; and setting by said processor as the gaze point, a crossing coordinate nearest to the virtual viewpoint, said crossing coordinate being from among a range of crossing coordinates for which the line segment crosses the obstacle so as to increase the view angle from a preset reference angle.

* * * * *